(12) United States Patent
Suzuki

(10) Patent No.: US 10,001,782 B2
(45) Date of Patent: Jun. 19, 2018

(54) TARGET PATHWAY GENERATING DEVICE AND DRIVING CONTROL DEVICE

(71) Applicant: Nissan Motor Co., Ltd., Yokohama-shi, Kanagawa (JP)

(72) Inventor: Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/538,503

(22) PCT Filed: Jun. 30, 2015

(86) PCT No.: PCT/IB2015/001087
§ 371 (c)(1),
(2) Date: Jun. 21, 2017

(87) PCT Pub. No.: WO2016/110733
PCT Pub. Date: Jul. 14, 2016

(65) Prior Publication Data
US 2017/0351262 A1    Dec. 7, 2017

Related U.S. Application Data

(60) Provisional application No. 62/099,631, filed on Jan. 5, 2015.

(51) Int. Cl.
*G05D 1/02* (2006.01)
*G08G 1/0967* (2006.01)
*G05D 1/00* (2006.01)

(52) U.S. Cl.
CPC ......... *G05D 1/0223* (2013.01); *G05D 1/0088* (2013.01); *G05D 1/0246* (2013.01); *G05D 1/0257* (2013.01); *G08G 1/096725* (2013.01)

(58) Field of Classification Search
CPC .. G05D 1/0223; G05D 1/0088; G05D 1/0257; G05D 1/0246; G08G 1/096725
USPC .......................................................... 701/25
See application file for complete search history.

(56) References Cited

U.S. PATENT DOCUMENTS

2009/0164080 A1    6/2009    Kurata et al.

FOREIGN PATENT DOCUMENTS

| JP | 7-117524 A | 5/1995 |
|---|---|---|
| JP | 2004-322764 A | 11/2004 |
| JP | 2010-188950 A | 9/2010 |
| JP | 2011-240816 A | 12/2011 |

*Primary Examiner* — Brian P Sweeney
(74) *Attorney, Agent, or Firm* — Global IP Counselors, LLP

(57) ABSTRACT

A target pathway generating device basically has a generating unit that generates a target pathway at a predetermined timing for controlling the driving of a vehicle in a predetermined section, and a setting unit that sets a target vehicle speed in advance at a section endpoint of the section in which the vehicle is currently driven. The target vehicle speed is used when the generating unit cannot generate a target pathway at the predetermined timing. The setting unit sets the target vehicle speed based on road information in the predetermined section.

12 Claims, 5 Drawing Sheets

TARGET PATHWAY GENERATING DEVICE AND DRIVING CONTROL DEVICE

CROSS-REFERENCE TO RELATED APPLICATIONS

This application is a U.S. National stage application of International Application No. PCT/IB2015/001087, filed Jun. 30, 2015.

BACKGROUND

Field of the Invention

The present invention relates to a target pathway generating device. More specifically, the present invention relates to a target pathway generating device that generates a target pathway for controlling the driving of a vehicle.

Background Information

Attempts are being made to develop an autonomous driving control device that is capable of autonomously controlling a vehicle from a departure point to a destination (for example refer to Japanese Laid-Open Patent Publication No. 2011-240816—Patent Document 1). In this type of autonomous driving control device, for example, a course (pathway) of a vehicle from a departure point to a destination is calculated using a well-known navigation technique, and lanes and obstacles on the course are detected using sensing technology, such as a radar sensor, an image sensor, etc. The autonomous driving control device causes the vehicle to driving autonomously along a course based on the detected information.

SUMMARY

In the control of a vehicle in such autonomous driving, the pathway from a departure point to a destination can be divided into predetermined sections, and a target pathway that shows the vehicle's driving trajectory and the vehicle's behavior (for example, vehicle speed, acceleration, steering angle, etc.) can be updated for each section, to be used in the control of the vehicle.

In such updating of the target pathway, it is conceivable to set a pathway update point before the endpoint of the section, and to carry out an update to a new target pathway at the pathway update point. In addition, in this case, it is conceivable to set in advance a target pathway to be used after passing the pathway update point, so that the vehicle is appropriately controlled even in a case in which calculation of a new target pathway is not completed at the pathway update point, due to the calculation for the new target pathway taking time. For example, it is conceivable to set in advance a target pathway such that the vehicle stops at the endpoint of the section, if calculation of a new target pathway is not completed at the pathway update point. However, a control that uniformly stops the vehicle in this manner is inconvenient for a user riding in the vehicle, and there is the possibility that the user will feel discomfort in the ride quality.

The object of the present invention is to provide a target pathway generating device that reduces the discomfort that is felt by the user upon updating of the target pathway.

The target pathway generating device as one embodiment of the present invention comprises a generating unit that generates, at predetermined timing, a target pathway for controlling the driving of a vehicle in a predetermined section, and a setting unit that sets a target vehicle speed in advance at a section endpoint of the section in which the vehicle is currently traveling, which is a target vehicle speed that is used when the generating unit cannot generate a target pathway at the predetermined timing, wherein the setting unit sets the target vehicle speed based on road information in the predetermined section.

According to the present invention, it becomes possible to provide a target pathway generating device that reduces discomfort that is felt by the user upon updating of the target pathway.

DETAILED DESCRIPTION OF THE EMBODIMENTS

The driving control device 10 according to the embodiment will be described with reference to FIG. 1-FIG. 5.

Figure 1:
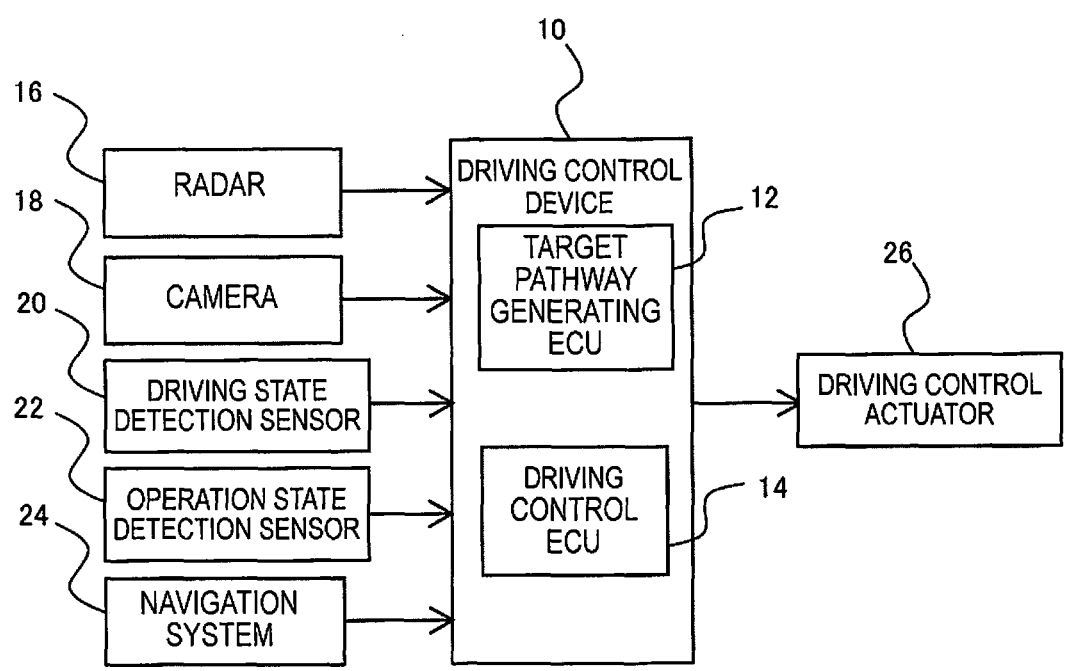
FIG. 1 is a block diagram illustrating the driving control device according to an embodiment of the invention.

FIG. 1 is a block diagram illustrating the driving control device 10 according to one embodiment of the invention. The driving control device 10 is a device mounted in a vehicle, and is a device for autonomously controlling driving of the vehicle along a course (pathway) from a departure point to a destination, which is calculated using navigation technology, or the like. In particular, the driving control device 10 divides the course from the departure point to the destination into predetermined sections, updates a target pathway that shows the vehicle's driving trajectory and the vehicle's behavior (for example, vehicle speed, acceleration, steering angle, etc.) for each section, and controls the driving of the vehicle based on the target pathway.

The driving control device 10 comprises a target pathway generating ECU (Electronic Control Unit) 12 and a driving control ECU 14, as illustrated in FIG. 1. In addition, radar 16, a camera 18, a driving state detection sensor 20, an operation state detection sensor 22, a navigation system 24, and the like, are electrically connected to the driving control device 10, as illustrated in FIG. 1. Furthermore, a driving control actuator 26 is electrically connected to the driving control device 10. The driving control device 10 can be appropriately connected to other well-known configurations, such as a communication unit for carrying out inter-vehicle communication.

The target pathway generating ECU 12 and the driving control ECU 14 are each electronic control units comprises a CPU (Central Processing Unit) and a memory, such as a ROM (Read Only Memory) and RAM (Random Access Memory). The target pathway generating ECU 12 acquires map information and a course from a departure point to a destination searched by the navigation system 24, and calculates a target pathway that represents the driving trajectory of the vehicle and the behavior of the vehicle for each predetermined section that is set on the course. The driving control ECU 14 controls the driving of the vehicle based on the target pathway generated by the target pathway generating ECU 12. For example, the driving control ECU 14 calculates the driving control amount of the host vehicle, such as acceleration/deceleration and the steering angle, based on the target pathway generated by the target pathway generating ECU 12, as well as data from the radar 16, the camera 18, the driving state detection sensor 20, the operation state detection sensor 22, and the navigation system 24. Furthermore, the driving control ECU 14 controls the driving control actuator 26 based on the driving control amount. In FIG. 1, the target pathway generating ECU 12 and the driving control ECU 14 are described as independent ECUs, but the two can be integrally configured as appropriate.

The radar 16 detects the presence, position, and speed, as well as the relative speed with respect to the host vehicle, of a vehicle, a motorcycle, a bicycle, a pedestrian, and the like, surrounding the host vehicle. The radar 16 comprises, for example, a laser radar, a millimeter wave radar, an ultrasonic radar, or the like. The radar 16 outputs the detected data to the driving control device 10. Since a well-known radar can be appropriately used as the radar 16, a detailed description of the configuration will be omitted.

The camera 18 is, for example, attached to the front or the side of the host vehicle, and captures an image of the host vehicle's surroundings. For example, the camera 18 captures road section lines and obstacles on the course. The camera 18 comprises an imaging element, such as a CCD (Charge Coupled Device) or CMOS (Complementary Metal-oxide Semiconductor). The camera 18 outputs the captured image to the driving control device 10. Since a well-known camera can be appropriately used as the camera 18, a detailed description of the configuration will be omitted.

The driving detection state sensor 20 detects the driving state (for example, vehicle speed, acceleration, yaw angle, etc.) of the host vehicle. The driving state detection sensor 20 has, for example, a wheel speed sensor provided for each wheel of the host vehicle, and detects the driving state of the host vehicle, such as the vehicle speed, by measuring the wheel speed. The driving state detection sensor 20 outputs the detected driving state of the host vehicle to the driving control device 10. Since a well-known vehicle speed sensor, acceleration sensor, and yaw angle sensor can be used as the driving state detection sensor 20, a detailed description of the configuration will be omitted.

The operation state detection sensor 22 detects the operation state of the host vehicle. Specifically, the operation state detection sensor 22 detects the accelerator operation, the brake operation, the handling operation (steering), and the like, of a user that rides in the vehicle (hereinafter referred to as driver). The operation state detection sensor 22 outputs the detected operation state of the host vehicle to the driving control device 10. Since a well-known accelerator operation sensor, brake operation sensor, and steering sensor can be used as the operation state detection sensor 22, a detailed description of the configuration will be omitted.

The navigation system 24 receives GPS signals from a GPS (Global Positioning System) satellite. In addition, the navigation system 24 can comprise a gyroscope that detects the magnitude of a rotational movement applied to the vehicle, an acceleration sensor that detects the driving distance of the vehicle from acceleration in three axial directions, and the like, and a geomagnetic sensor that detects the driving direction of the vehicle from geomagnetism, or the like. The navigation system 24 stores map information (road information) in a storage medium, such as a hard disk. This map information contains information relating to the locations and shapes of roads and intersections, and to traffic rules, including traffic signs, signals, and the like. In addition, map information can define the drivable area of the vehicle within the lane on the road. The navigation system 24 detects the position of the host vehicle and the orientation with respect to the road, based on the map information and GPS signals from a GPS satellite. The navigation system 24 searches a course from the departure point to the destination, according to inputs of the departure point (or the current position) and the destination, and carries out pathway guidance to the destination, using the searched course and the positional information of the host vehicle. In addition, the navigation system 24 outputs the searched course to the driving control device 10 together with the map information. Since a well-known navigation system can be appropriately used as the navigation system 24, a detailed description of the configuration will be omitted.

The driving control actuator 26 comprises an acceleration/deceleration actuator for accelerating and decelerating the host vehicle, and a steering actuator that adjusts the steering angle. The driving control actuator 26 controls the driving of the host vehicle by causing the acceleration/deceleration actuator and the steering actuator to operate, based on the driving control amount that is transmitted from the driving control ECU 14.

Figure 2:
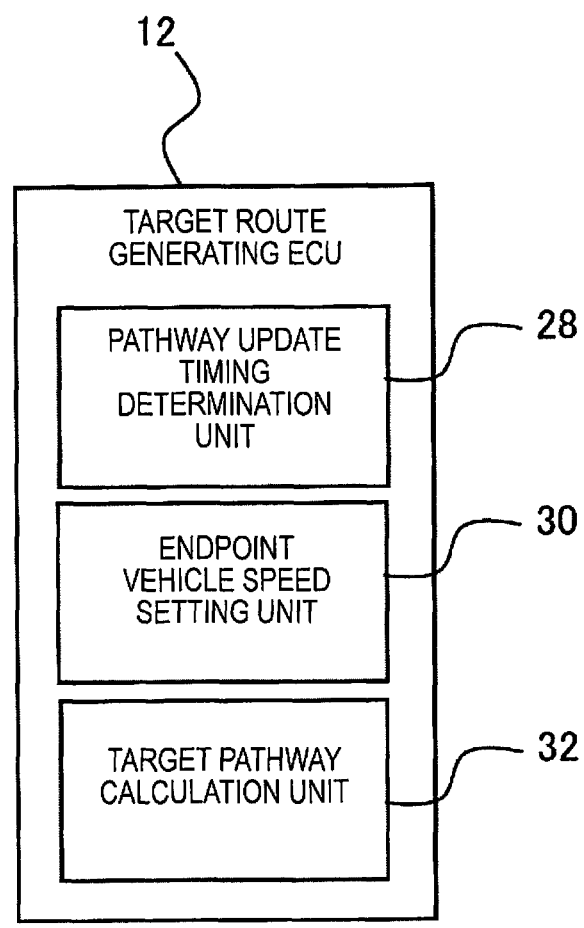
FIG. 2 is a block diagram illustrating the target pathway generating ECU of the driving control device.

Next, the generation of a target pathway by the target pathway generating ECU 12 will be described, with reference to FIG. 2 to FIG. 5. The target pathway generating ECU 12 comprises a pathway update timing determination unit 28, an endpoint vehicle speed setting unit 30, and a target pathway calculation unit 32, as illustrated in FIG. 2.

Figure 3:
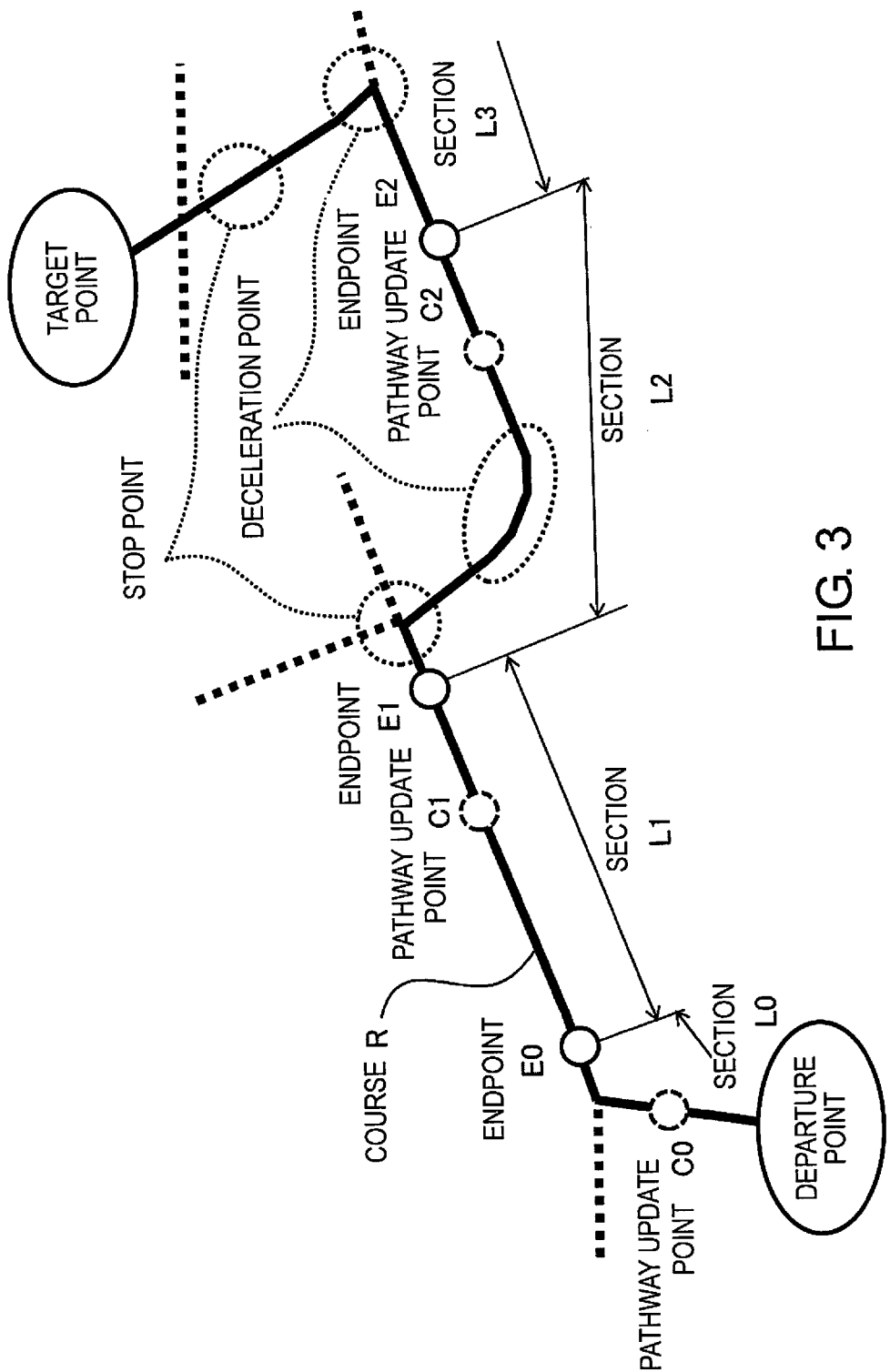
FIG. 3 is a schematic view describing the update of the target pathway.

The target pathway generating ECU 12 acquires map information and a course from a departure point to a destination searched by the navigation system 24, calculates a target pathway that represents the driving trajectory of the vehicle and the behavior of the vehicle for each predetermined section that is set on the course, and updates the target pathway for each section. Specifically, the target pathway generating ECU 12 acquires map information together with a course R from a departure point to the destination searched by the navigation system 24, as illustrated in FIG. 3. Then, the target pathway generating ECU 12 divides the course R from the departure point to the destination into predetermined sections, and updates the target pathway for each section. In the present embodiment, for example, the sections are set by dividing the course R every 200 m. Of course, the method of dividing the sections is not limited to this distance, and can be a distance that is different from this distance. In addition, it is not necessary for the sections to be divided into the same distances, and the method of dividing can be changed as necessary. Some of the successive sections divided in this manner are indicated as section L0, section L1, section L2, section L3 . . . in FIG. 3.

In addition, a pathway update point for updating the target pathway is set in each of the sections. In FIG. 3, the pathway update points of sections L0, L1, and L2 are respectively indicated as pathway update points C0, C1, and C2. In the present embodiment, when a host vehicle passes a pathway update point of a section using a navigation system 24, or the like, the target pathway generating ECU 12 calculates the target pathway from the pathway update point to the endpoint of the following section, and updates the target pathway. In FIG. 3, for example, when the host vehicle passes the pathway update point C1 of section L1, the target pathway generating ECU 12 calculates target pathways from the pathway update point C1 to the endpoint E1 of section L1, and from the endpoint E1 of section L1 (origin point of section L2) to the endpoint E2 of section L2, and updates the target pathway that is currently being used with the newly calculated target pathway. The same updating of the target pathway is carried out in section L2 as well. Specifically, when the host vehicle passes the pathway update point C2 of section L2, the target pathway generating ECU 12 calculates target pathways from the pathway update point C2 to the endpoint E2 of section L2, and from the endpoint E2 of section L2 (origin point of section L3) to the endpoint of section L3, and updates the target pathway calculated at the pathway update point C1 of section L1 with the newly calculated target pathway. In the present embodiment, for example, the pathway update point is set to a position before the endpoint of a section by a predetermined distance (that is, a position at which the remaining distance of the section becomes a predetermined distance). For example, in the present embodiment, this predetermined distance is set to 50 m. Of course, the position of the pathway update point is not limited to this position, and can be position that is different from this position. In addition, the pathway update point can be set to a position at which the time remaining until the vehicle reaches the endpoint of the section becomes a predetermined time or less.

The target pathway generating ECU 12 of the present embodiment is a device that sets the vehicle speed at the endpoint of a section such that the driving of the vehicle is controlled at an appropriate vehicle speed, even in a case in which calculation of a new target pathway is not completed at the pathway update point, for reasons such as the calculation for the new target pathway at the pathway update point taking time.

The operation of the pathway update timing determination unit 28, the endpoint vehicle speed setting unit 30, and the target pathway calculation unit 32 of the target pathway generating ECU 12, as well as the operation of the driving control ECU 14, according to the present embodiment will be described, with reference to the flowchart in FIG. 4. The generation of a target pathway at the pathway update point C1 of section L1 will be described below, but the same generation of target pathways is carried out in the other sections as well.

The pathway update timing determination unit 28 determines whether or not the vehicle has passed the pathway update point C1 of section L1, in which the vehicle is currently traveling, from the location information of the host vehicle, which can be acquired from the navigation system 24, or the like (Step S10). If the pathway update timing determination unit 28 determines that the vehicle has passed the pathway update point C1 (YES in Step S10), the endpoint vehicle speed setting unit 30 sets the target vehicle speed at the endpoint E2 of the next section L2 (Step S12).

In this setting of the target vehicle speed, the target vehicle speed at the endpoint E2 of section L2 is set based on map information of section L3, which is a section after the endpoint E2, and the like. Specifically, the endpoint vehicle speed setting unit 30 acquires data, such as stop points and deceleration points that are contained in section L3, and the required deceleration amounts at the deceleration points, based on map information obtained from the navigation system 24, or the like, and sets the target vehicle speed at the endpoint E2 of section L2 according to these data.

For example, upon determining that section L3 contains stop points, such as stop signs and traffic lights, based on traffic rules contained in the map information, or the like, the endpoint vehicle speed setting unit 30 sets the target vehicle speed at the endpoint E2 of section L2 to 0 (stop). It is not necessary for the target vehicle speed to be provided as a value of the vehicle speed (that is 0); the target vehicle speed can be provided as the deceleration degree (in this case, a deceleration of 100%).

In addition, upon determining that section L3 contains points at which the speed limit becomes low, based on traffic rules contained in the map information, or upon determining that section L3 contains turns and curves, based on information of roads and intersections contained in the map information, the endpoint vehicle speed setting unit 30 further determines the required deceleration amount at these deceleration points. For example, if section L3 contains a deceleration point at which the speed limit decreases from 60 km per hour to 40 km per hour, the target vehicle speed at the endpoint of section L2 is set to 40 km per hour. Or, for example, if section L3 contains an intersection or a curve that requires deceleration, a predetermined vehicle speed that is set in advance in accordance with the curvature of the intersection or the curve is set as the target vehicle speed. For example, this predetermined vehicle speed is stored in a memory of the target pathway generating ECU 12 in advance, such that the predetermined vehicle speed is reduced as the curvature is increased. It is not necessary for the target vehicle speed to be provided as a value of the vehicle speed; the target vehicle speed can be provided as the deceleration degree (for example, a deceleration of 40%).

If section L3 contains both a stop point and a deceleration point, the target vehicle speed at the endpoint E2 of section L2 can be set to 0 (stop). If section L3 contains multiple deceleration points, the lowest target vehicle speed from among the target vehicle speeds of the deceleration points can be set as the target vehicle speed.

In addition, upon determining that section L3 does not contain stop points or deceleration points based on the map information, the endpoint vehicle speed setting unit 30 determines that it is not necessary to decelerate/stop at the endpoint E2 of section L2. For example, the target is provided as a deceleration degree (in this case, a deceleration of 0%).

In the present embodiment, the endpoint vehicle speed setting unit 30 determines whether or not section L3 contains stop points or deceleration points based on map information obtained from the navigation system 24, or the like, but can determine whether or not section L3 contains stop points or deceleration points by other methods. For example, it is possible to determine whether or not section L3 contains stop points or deceleration points based on data that can be acquired from the radar 16 or the camera 18. Additionally, in the present embodiment, it is determined whether or not section L3 contains stop points or deceleration points, but the section as the target of determination is not limited thereto. For example, it is not necessary for the target to be the entire section L3; for example, a portion of section L3, such as a section that is a predetermined distance after the endpoint E2 of section L2, can be set as the target of determination.

The target vehicle speed (or deceleration degree) at the endpoint E2 of section L2 set in the manner described above is saved in a memory of the target pathway generating ECU 12 as the target vehicle speed Vn at the endpoint of the subsequent section, separately from the target vehicle speed Vp at the endpoint of the current section. That is, if the target vehicle speed at the endpoint of the subsequent section (for example the target vehicle speed at the endpoint E2 of section L2) is set in Step S12, the target vehicle speed that was saved as the target vehicle speed Vn at the endpoint of the subsequent section (for example, the target vehicle speed at the endpoint E1 of section L1, which was set at the pathway update point C0 of section L0) is newly saved as the target vehicle speed Vp at the endpoint of the current section, and the newly set target vehicle speed at the endpoint of the subsequent section is saved as the target vehicle speed Vn at the endpoint of the subsequent section.

The target pathway calculation unit 32 starts the calculation of a new target pathway (Step S14). Specifically, the target pathway calculation unit 32 calculates the target pathways from the pathway update point C1 to the endpoint E1 of section L1, and from the endpoint E1 of section L1 (origin point of section L2) to the endpoint E2 of section L2. For example, the target pathway calculation unit 32 generates a time function for the target vehicle speed (vehicle speed profile), in which the actual speed of the vehicle at the pathway update point C1 is the point of origin. This vehicle speed profile is saved in a memory, or the like, as a new target pathway, along with a target driving trajectory of the vehicle and a time function of the target steering amount (steering profile), which are generated separately, to update the target pathway that is currently being used. The target pathway calculation unit 32 generates this vehicle speed profile upon further considering map information of the subsequent section L2, which is acquired from the navigation system 24, in the same manner as well-known methods of target pathway calculation. In the same manner, the target pathway calculation unit 32 generates a target driving trajectory and a steering profile, based on map information of the subsequent section L2, which is acquired from the navigation system 24, in the same manner as well-known methods of target pathway calculation. For example, in this type of target pathway calculation, target pathways, such as the target driving trajectory, vehicle speed profile, and steering profile, are generated such that the lateral acceleration that is applied to the vehicle becomes less than or equal to 0.2 G, in accordance with the curvature of the course that is obtained from the map information.

Next, the target pathway calculation unit 32 determines whether or not the target pathway has been updated (Step S16). Specifically, it is determined whether or not calculation has been completed and the target pathway has been updated within a predetermined time from the start of the calculation of the new target pathway in Step S14. In the present embodiment, this predetermined time is set, for example, to 0.5 seconds, but the predetermined time is not limited to this value, and can be a value that is different from this value.

Upon determining that the target pathway has been updated (YES in Step S16), the driving control ECU 14 controls the driving of the vehicle based on the new target pathway saved in the memory of the target pathway generating ECU 12 (Step S18).

On the other hand, upon determining that calculation and update of the target pathway have not been completed within a predetermined time (NO in Step S16), the driving control ECU 14 acquires the target vehicle speed Vp at the endpoint of the current section, which is saved in the memory, or the like, of the target pathway generating ECU 12, as the target vehicle speed at the endpoint E1 of section L1 (Step S20). Such cases in which calculation and update of the target pathway are not completed within a predetermined time can be a case in which map information from the navigation system 24 cannot be appropriately acquired, or a case in which calculation takes time, due to the map information being complex, such as there being a large number of intersections and curves in the section from the pathway update point C1 to the endpoint E2. Additionally, the driving control ECU 14 controls the driving of the vehicle based on the acquired target vehicle speed Vp at the endpoint of the current section (Step S20). Specifically, the driving control ECU 14 controls the driving of the vehicle such that the vehicle speed smoothly becomes the target vehicle speed Vp at the endpoint E1 of section L1, with the actual speed of the vehicle at the present moment as the point of origin.

Figure 5:
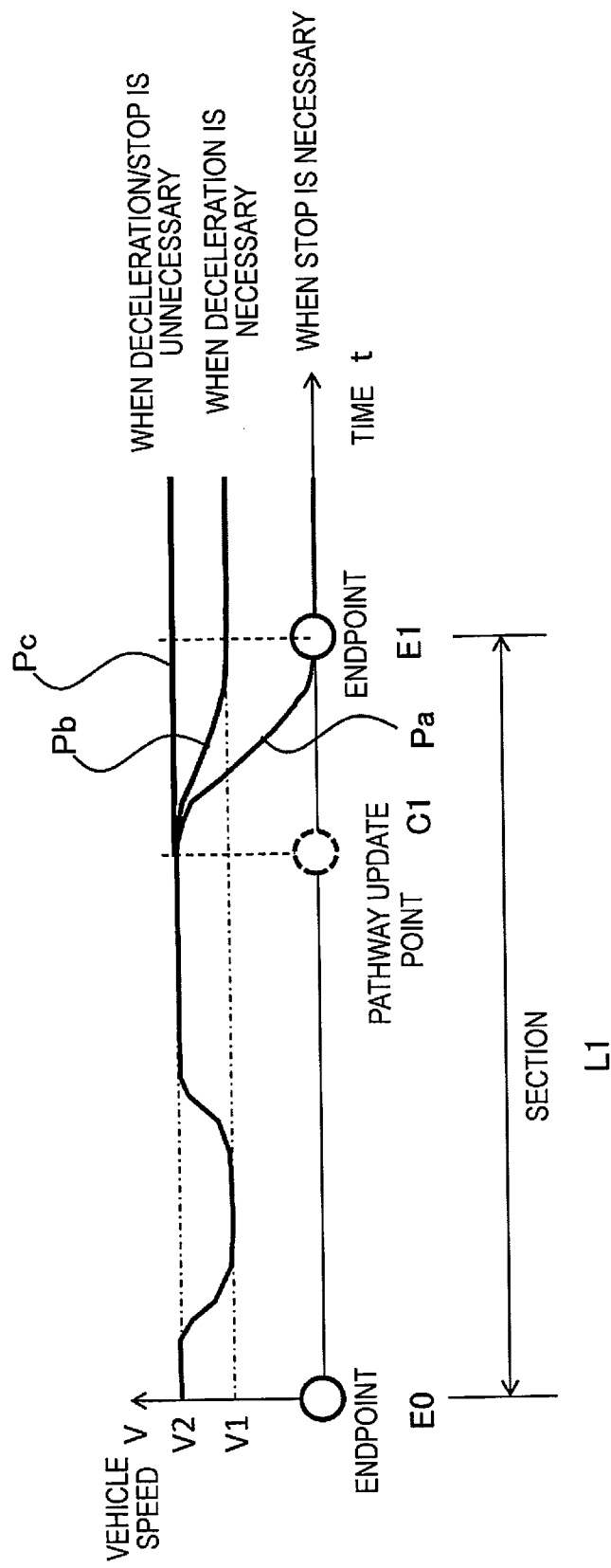
FIG. 5 is a schematic view illustrating the setting of a target vehicle speed when the update of the target pathway is not completed.

FIG. 5 illustrates a driving control of a vehicle in section L1 (section from the endpoint E0 of section L0 to the endpoint E1 of section L1) by the driving control device 10 of the present embodiment. The target pathway (target vehicle speed) that is generated at the pathway update point C0 of section L0 is provided from the endpoint E0 to the pathway update point C1, as illustrated in FIG. 5. On the other hand, if the target pathway cannot be updated at the pathway update point C1 (NO in Step S16), the driving of the vehicle is controlled based on the target vehicle speed at the endpoint E1 of section L1, which is set at the pathway update point C0 of section L0. For example, in a setting of the target vehicle speed at the endpoint E1 of section L1, which is executed at the pathway update point C0 of section L0 (Step S12), upon determining that it is necessary to stop at the endpoint E1 of section L1, driving control is carried out such that the vehicle speed becomes 0 (stop) at the endpoint E1 of section L1 (refer to vehicle speed profile Pa). Additionally, for example, in this setting of the target vehicle speed, upon determining that it is necessary to decelerate to vehicle speed V1 at the endpoint E1 of section L1, driving control is carried out such that the vehicle speed is decelerated to V1 at the endpoint E1 of section L1 (refer to the vehicle speed profile Pb). Additionally, for example, in this setting of the target vehicle speed, upon determining that it is not necessary to decelerate/stop at the endpoint E1 of section driving control is carried out to maintain the vehicle speed at V2 until the endpoint E1 of section L1 (refer to vehicle speed profile Pc).

In such an update of the target pathway, for example, it is also conceivable to set in advance a target pathway such that the vehicle uniformly stops at the endpoint of the section, if calculation of a new target pathway is not completed at the pathway update point, due to the calculation for the new target pathway taking time. However, a control that uniformly stops the vehicle in this manner would bring about an excessive deceleration if there is no intrinsic need to stop at the endpoint of the section. In addition, if the target pathway is updated thereafter, deceleration and acceleration are repeated, and there is the possibility that the user will feel discomfort in the ride quality.

On the other hand, in the present embodiment, the target vehicle speed at the endpoint of the subsequent section is set at the pathway update point, based on the stop points and the deceleration points in the section after the endpoint. Accordingly, it becomes possible to prevent unnecessary deceleration, and to reduce the discomfort that is felt by the user upon updating of the target pathway.

As described above, the target pathway generating ECU 12 (target vehicle speed generating device) according to the present embodiment comprises a target pathway calculation unit 32 (generating unit) that generates a target pathway at a pathway update point (predetermined timing) for controlling the driving of a vehicle in a predetermined section (for example section L2), and an endpoint vehicle speed setting unit 30 (setting unit) that sets a target vehicle speed in advance at an endpoint (for example endpoint E1) (section endpoint) of the section (for example section L1) in which the vehicle is currently traveling, which is a target vehicle speed that is used when the target pathway calculation unit 32 (generating unit) cannot generate a target pathway at the pathway update point (predetermined timing), wherein the endpoint vehicle speed setting unit 30 (setting unit) sets the target vehicle speed based on map information (road information) in the predetermined section (for example section L2). Accordingly, it becomes possible to provide a target pathway generating ECU 12 (target pathway generating device) that reduces the discomfort that is felt by the user upon updating of the target pathway.

In addition, the target pathway generating ECU 12 (target pathway generating device) can further comprise a pathway update timing determination unit 28 (determination unit) that determines the timing at which the vehicle reaches a position that is before the endpoint of a section (for example the endpoint E1 of section L1) by a predetermined distance, or a position at which the remaining time until reaching the endpoint of a section becomes a predetermined time or less (predetermined position), as the pathway update point (predetermined timing). Accordingly, it becomes possible to generate a target pathway at a timing at which the vehicle reaches a predetermined position.

Additionally, in the target pathway generating ECU 12 (target pathway generating device), the predetermined section (for example section L2) can include the subsequent section of the section in which the vehicle is currently traveling (for example section L1), and the target pathway calculation unit 32 (generating unit) can generate a target pathway of a predetermined section (for example section L2), when the vehicle reaches a position that is before the endpoint (for example the endpoint E1 of section L1) of a section in which the vehicle is currently traveling (for example section L1) by a predetermined distance, or a position at which the remaining time until reaching the endpoint of a section becomes a predetermined time or less (predetermined position). Accordingly, it becomes possible to generate a target pathway of the subsequent section at a timing at which the vehicle reaches a predetermined position of the section in which the vehicle is currently traveling.

In addition, in the target pathway generating ECU 12 (target pathway generating device), the endpoint vehicle speed setting unit 30 (setting unit) can set a target vehicle speed while the vehicle is driving in a section (for example section L0) before the section in which the vehicle is currently traveling (for example section L1). Accordingly, a target vehicle speed that is set in advance in the previous section can be used, even in a case in which the target pathway calculation unit 32 (generating unit) cannot generate a target pathway at the pathway update point (predetermined timing).

In addition, in the target pathway generating ECU 12 (target pathway generating device), the endpoint vehicle speed setting unit 30 (setting unit) can set a target vehicle speed in advance based on the stop points or the deceleration points of the vehicle in a predetermined section (for example section L2) in the map information (road information). Accordingly, it is possible to appropriately set a target vehicle speed at the section endpoint of the section in which the vehicle is currently traveling, in accordance with the stop points or the deceleration points of the vehicle in a predetermined section.

As described above, the driving control device 10 according to the present embodiment comprises a target pathway generating ECU 12 (target vehicle speed generating device), and a driving control ECU 14 (control device) that controls the driving of the vehicle, based on the target pathway that is generated by the target pathway generating ECU 12. Accordingly, it is possible to provide a driving control device 10 that is capable of reducing the discomfort that is felt by the user upon updating of the target pathway.

Figure 4:
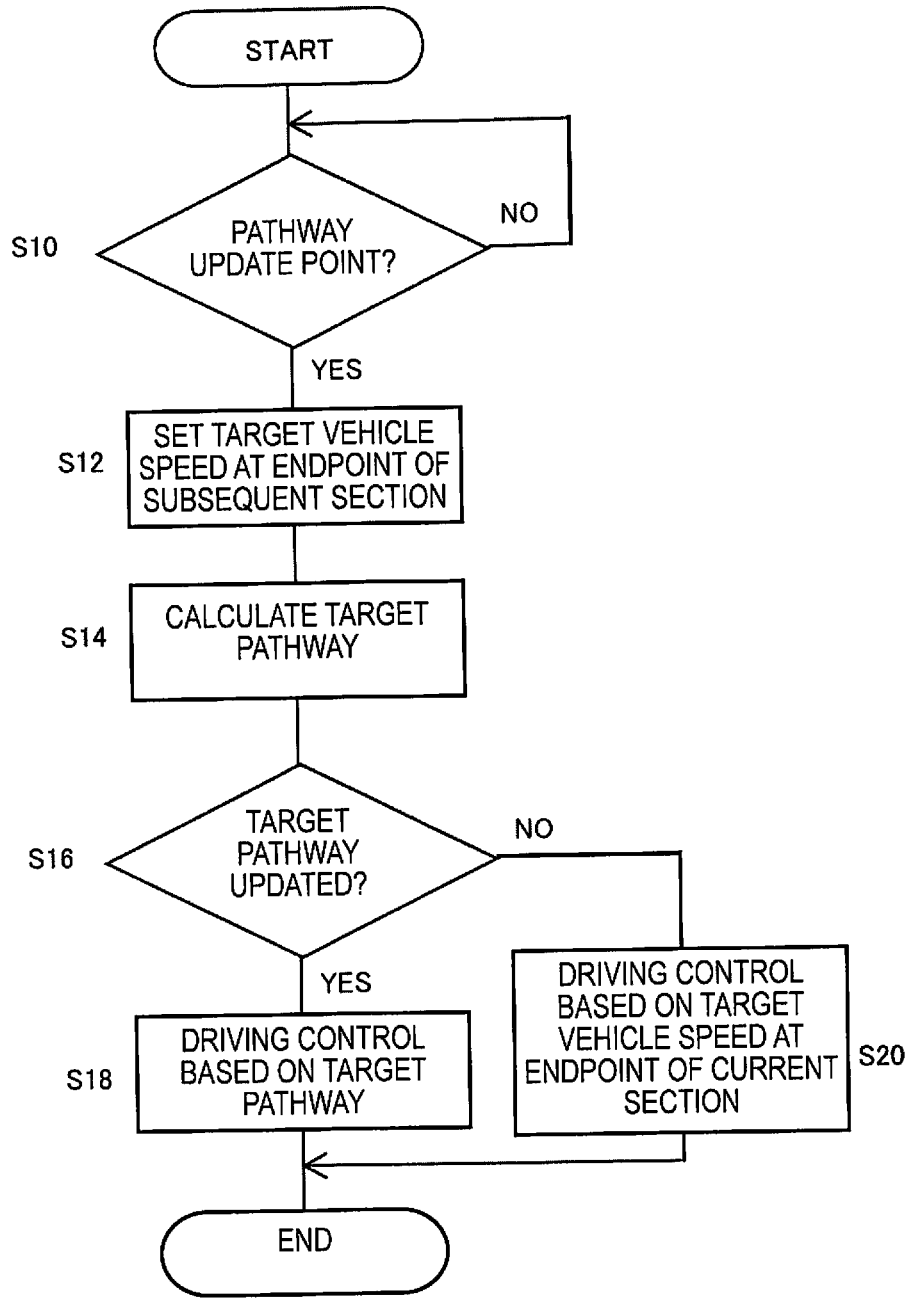
FIG. 4 is a flowchart describing the generation of the target pathway.

In addition, the driving control ECU 14 (control device) can control the driving of the vehicle based on the target vehicle speed, in a case in which the target pathway calculation unit 32 (generating unit) cannot generate a target pathway at the pathway update point (predetermined timing) (NO in Step S16 of FIG. 4). Accordingly, the driving of the vehicle can be controlled based on a target vehicle speed that is set in advance, even in a case in which the target pathway calculation unit 32 (generating unit) cannot generate a target pathway at the pathway update point (predetermined timing).

Additionally, the driving control ECU 14 (control device) can control the driving of the vehicle at least up to the endpoint (for example the endpoint E1) (section endpoint) of the section in which the vehicle is currently traveling (for example section L1), based on the target vehicle speed (for example vehicle speed profiles Pa, Pb, Pc). Accordingly, the driving of the vehicle can be controlled based on a target vehicle speed that is set in advance, even in a case in which the target pathway calculation unit 32 (generating unit) cannot generate a target pathway at the pathway update point (predetermined timing), at least up to the endpoint (for example the endpoint E1) (section endpoint) of the section in which the vehicle is currently traveling (for example section L1).

In addition, the driving control ECU 14 (control device) can control the driving of the vehicle in at least a portion of the section of a predetermined section (for example section L2), based on the target vehicle speed (for example vehicle speed profiles Pa, Pb, Pc). Accordingly, the driving of the vehicle can be controlled based on a target vehicle speed that is set in advance, even in a case in which the target pathway calculation unit 32 (generating unit) cannot generate a target pathway at the pathway update point (predetermined timing), beyond the endpoint (for example the endpoint E1) (section endpoint) of the section in which the vehicle is currently traveling (for example section L1).

In addition, the driving control ECU 14 (control device) can control the driving of the vehicle based on the target vehicle speed, in a case in which the target pathway calculation unit 32 (generating unit) cannot generate a target pathway at the pathway update point (predetermined timing) within a predetermined time (NO in Step S16 of FIG. 4). Accordingly, it becomes easy to determine cases in which the target pathway calculation unit 32 (generating unit) cannot generate a target pathway at the pathway update point (predetermined timing).

MODIFIED EXAMPLES

A driving control device 10 was described in detail above, but the driving control device 10 is not limited to the above-described embodiment. Additionally, it goes without saying that various improvements and modifications may be made without departing from the spirit of the present invention.

Modified Example 1

In the present embodiment, setting of the target vehicle speed (Step S12) and calculation of the target pathway (Step S14) are carried out when it is determined that the vehicle has passed a pathway update point (YES in Step S10), as illustrated in FIG. 4. Furthermore, it is determined whether or not calculation has been completed within a predetermined time after starting the calculation of a target pathway (Step S16). However, a pathway update starting point can be set, in advance, before the pathway update point at a position that is away from the pathway update point by a predetermined distance. In this case, setting of the target vehicle speed (Step S12) and calculation of the target pathway (Step S14) can be started when it is determined that the vehicle has passed a pathway update starting point, and it can be determined whether or not the target pathway has been updated at the pathway update point (Step S16). Additionally, in this case, it can be determined whether or not the calculation of the target pathway has been completed within a predetermined time after the vehicle passes the pathway update starting point, and an update to the newly calculated target pathway can be carried out at the pathway update point if the calculation of the target pathway has been completed, and a driving control based on the set target vehicle speed can be carried out at the pathway update point if the calculation of the target pathway has not been completed.

Modified Example 2

In the present embodiment, calculation of the target pathway (Step S14), determination of whether or not the target pathway has been updated (Step S16), driving control based on the target pathway (Step S18), and driving control based on the target vehicle speed Vp at the endpoint of the current section (Step S20), are carried out after carrying out a setting of the target vehicle speed Vn at the endpoint of the subsequent section (Step S12), as illustrated in FIG. 4. However, the order of these processes can be appropriately changed. For example, the calculation of the target pathway (Step S14), the determination of whether or not the target pathway has been updated (Step S16), the driving control based on the target pathway (Step S18), and the driving control based on the target vehicle speed at the endpoint of the current section (Step S20), can be carried out before the setting of the target vehicle speed at the endpoint of the subsequent section (Step S12). In this case, the endpoint vehicle speed setting unit 30 sets the target vehicle speed at the endpoint of the subsequent section (Step S12), after the driving control ECU 14 reads the target vehicle speed at the endpoint of the current section, saved in a memory, or the like, of the target pathway generating ECU 12, in the driving control based on the target vehicle speed at the endpoint of the current section (Step S20). Accordingly, it is not necessary to separately save the target vehicle speed at the endpoint of the current section and the target vehicle speed of the subsequent section in the memory of the target pathway generating ECU 12; it is sufficient to simply save the target vehicle speed that is newly set in this Step S12 by overwriting.

Modified Example 3

As described using FIG. 4, in the present embodiment, when setting the target vehicle speed at the endpoint E2 of the subsequent section L2, if section L3 contains a stop point, the target vehicle speed at the endpoint E2 of section L2 is set to 0 (stop). However, the deceleration degree can be changed in accordance with the position of this stop point in section L3. For example, driving can be controlled at a predetermined target vehicle speed without stopping at the endpoint E2 of section L2, if this stop point is away from the endpoint E2 by greater than or equal to a predetermined distance that is set in advance. In addition, the deceleration degree to the endpoint E2 of section L2 can be configured to be reduced as the distance from the endpoint E2 to the stop point is increased.

In the same manner, in the present embodiment, when setting the target vehicle speed at the endpoint E2 of the subsequent section L2, if section L3 contains a deceleration point, deceleration is carried out such that the vehicle speed becomes a predetermined vehicle speed at the endpoint E2 of section L2. However, the deceleration degree can be changed according to the position of this deceleration point in section L3. For example, the deceleration degree can be reduced such that the vehicle speed will be greater than this predetermined vehicle speed at the endpoint E2 of section L2, if this deceleration point is away from the endpoint E2 by greater than or equal to a predetermined distance that is set in advance. Additionally, the deceleration degree to the endpoint E2 of section L2 can be reduced as the distance from the endpoint E2 to the deceleration point is increased As described above, in the target pathway generating ECU 12 (target pathway generating device), the endpoint vehicle speed setting unit 30 (setting unit) can set a target vehicle speed in advance based on the distance from the endpoint of a section (for example, the endpoint E1 of section L1 or the endpoint E2 of section L2) (section endpoint) to the stop point or the deceleration point of the vehicle in a predetermined section (for example section L2 or section L3). Accordingly, it is possible to appropriately set a target vehicle speed at the section endpoint of the section in which the vehicle is currently traveling, according to the distance from the endpoint of a section to the stop point or the deceleration point of the vehicle in a predetermined section.

Modified Example 4

As described using FIG. 4, upon determining that calculation and update of the target pathway have not been completed within a predetermined time (NO in Step S16), the driving control ECU 14 controls the driving of the vehicle based on the target vehicle speed Vp at the endpoint of the current section (Step S20). At this time, upon determining that calculation and update of the target pathway have not been completed within a predetermined time (NO in Step S16), the calculation of the target pathway by the target pathway calculation unit 32 can be stopped, or the calculation of the target pathway by the target pathway calculation unit 32 can be continued. If the calculation of the target pathway by the target pathway calculation unit 32 is continued and the time remaining until the completion of calculation and updating can be acquired, the driving control ECU 14 can change the deceleration degree to the endpoint of the section according to this remaining time. For example, if the remaining time is shorter than a predetermined time (for example one second), the driving of the vehicle can be controlled with a smaller deceleration degree than the deceleration degree of when stopping the vehicle, even if the target vehicle speed Vp at the endpoint of the current section is 0 (stop). That is, if the remaining time is shorter than a predetermined time, the driving of the vehicle can be controlled with a smaller deceleration degree than the deceleration degree of when decelerating the vehicle to the target vehicle speed Vp at the endpoint of the current section.

As described above, the driving control ECU 14 (control device) can control the driving of the vehicle by changing the target vehicle speed to a smaller deceleration degree than the deceleration degree of when decelerating to the target vehicle speed, even if the target pathway calculation unit 32

(generating unit) cannot generate a target pathway at the pathway update point (predetermined timing) (NO in Step S16 of FIG. 4), if the target pathway calculation unit 32 (generating unit) can generate a target pathway within a predetermined time (predetermined time). Accordingly, if the target pathway can be generated within a predetermined time, the driving of the vehicle can be controlled by changing the target vehicle speed such as to reduce the discomfort that is felt by the user upon updating to the target pathway.

Modified Example 5

As described using FIG. 4, in the present embodiment, the endpoint vehicle speed setting unit 30 sets the target vehicle speed at the endpoint E2 of the subsequent section L2 (Step S12). The target vehicle speed that is set by the endpoint vehicle speed setting unit 30 can be set as a value of the vehicle speed at the endpoint E2 of section L2, or be set as a time function of the vehicle speed (vehicle speed profile) up to the endpoint E2 of section L2. If the target vehicle speed is set as a vehicle speed profile, the endpoint vehicle speed setting unit 30 generates a vehicle speed profile (for example, any one of the vehicle speed profiles Pa, Pb, and Pc illustrated in FIG. 5) in Step S12. The driving control ECU 14 controls the driving of the vehicle based on the generated vehicle speed profile in Step S20.

Additionally, in the case the target vehicle speed is set as a value of the vehicle speed at the endpoint E2 of section L2, the endpoint vehicle speed setting unit 30 can generate a vehicle speed profile (for example, any one of the vehicle speed profiles Pa, Pb, and Pc illustrated in FIG. 5) based on this value of the vehicle speed, upon determining that calculation and update of the target pathway have not been completed within a predetermined time (NO in Step S16). The driving control ECU 14 controls the driving of the vehicle based on the generated vehicle speed profile in Step S20 illustrated in FIG. 4.

Furthermore, in the case the target vehicle speed is set as a value of the vehicle speed at the endpoint E2 of section L2, the target pathway calculation unit 32 can calculate the target pathway based on this value of the vehicle speed, in the calculation of the target pathway from the pathway update point C1 in section L1 to the endpoint E2 of section L2 in Step S14. In this case, if the calculation and update of the target pathway from the pathway update point C2 of section L2 to the endpoint of section L3 is not completed in section L2, the driving control of the vehicle is continued based on the target pathway that is currently being used. That is, the driving control from the pathway update point C2 of section L2 to the endpoint E2 is carried out based on the target pathway that is currently being used such that the vehicle speed at the endpoint E2 becomes the set value of the vehicle speed, and the vehicle speed at the endpoint E2 is maintained thereafter. Of course, if the calculation and update of the target pathway from the pathway update point C2 of section L2 to the endpoint of section L3 is completed in section L2, the target pathway that is currently being used is updated with the newly calculated target pathway.

In the embodiments described above, autonomous driving control is carried out by the driving control ECU 14; however, the generation of a target pathway of the present application can be used even if a fully autonomous driving control is not carried out, or even when an autonomous driving control is not carried out at all. For example, the a target pathway generated by the target pathway generating ECU 12 can be simply notified to the driver, or the driving conditions for achieving the generated target pathway can be notified to the user. In these cases, driving support for supporting the driving of the user (driver) will be carried out instead of an autonomous driving control. In addition, even if a fully autonomous driving control is not carried out, driving assistance can be carried out, such as carrying out only acceleration/deceleration or only steering by the driving control device 10.

The invention claimed is:

1. A target pathway generating device, comprising:
an electronic controller configured to
generate a target pathway at a predetermined timing in a section in which the vehicle is currently traveling, to control driving of a vehicle in a predetermined section; and
set a target vehicle speed in advance at a section endpoint of the section in which the vehicle is currently traveling, which is a target vehicle speed that is used when the electronic controller cannot generate the target pathway at the predetermined timing,
the electronic controller being further configured to set the target vehicle speed based on road information in the predetermined section.

2. The target pathway generating device according to claim 1, wherein
the electronic controller is further configured to determine a timing at which the vehicle reaches a predetermined position as the predetermined timing based on location information of the vehicle.

3. The target pathway generating device according to claim 1, wherein
the predetermined section includes a subsequent section of the section in which the vehicle is currently traveling; and
the electronic controller is further configured to generate the target pathway of the predetermined section, upon the vehicle reaching the predetermined position of the section in which the vehicle is currently traveling.

4. The target pathway generating device according to claim 1, wherein
the electronic controller is further configured to set the target vehicle speed while the vehicle is driving in a section before the section in which the vehicle is currently traveling.

5. The target pathway generating device according to claim 1, wherein
the electronic controller is further configured to set the target vehicle speed in advance based on a stop point or a deceleration point of the vehicle in the predetermined section in the road information.

6. The target pathway generating device according to claim 5, wherein
the electronic controller is further configured to set the target vehicle speed in advance based on a distance from the section endpoint to the stop point or the deceleration point of the vehicle in the predetermined section.

7. A driving control device comprising the target pathway generating device according claim 1, and further comprising:
an electronic driving controller configured to control the driving of the vehicle using a driving control actuator based on the target pathway generated by the target vehicle speed generating device.

8. The driving control device according to claim 7, wherein the electronic driving controller is further configured to control the driving of the vehicle based on the target vehicle speed in a case in which the electronic controller cannot generate the target pathway at a predetermined timing.

9. The driving control device according to claim 7, wherein
the electronic driving controller is further configured to control the driving of the vehicle based on the target vehicle speed at least up to the section endpoint.

10. The driving control device according to claim 7, wherein
the electronic driving controller is further configured to control the driving of the vehicle based on the target vehicle speed in at least a portion of the predetermined section.

11. The driving control device according to claim 7, wherein
the electronic driving controller is further configured to control the driving of the vehicle based on the target vehicle speed, in a case in which the electronic controller cannot generate the target pathway at the predetermined timing within a predetermined time.

12. The driving control device according to claim 7, wherein
the electronic driving controller is further configured to control the driving of the vehicle by changing the target vehicle speed, in a case in which the electronic controller can generate the target pathway within a predetermined time, even if the electronic controller cannot generate the target pathway at the predetermined time.

* * * * *